Dec. 1, 1931.  C. A. MARIEN  1,834,067
PISTON RING EXPANDER
Filed Sept. 13, 1930
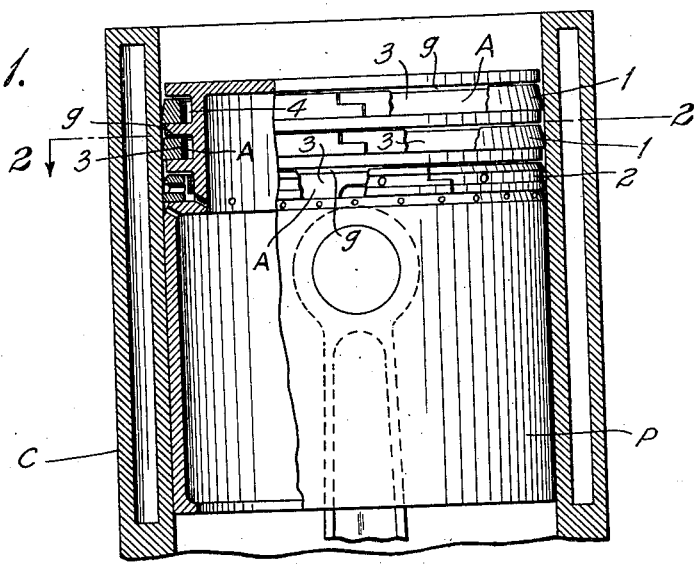
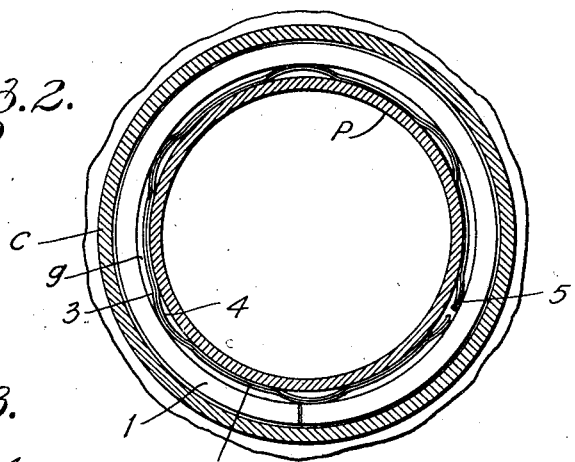
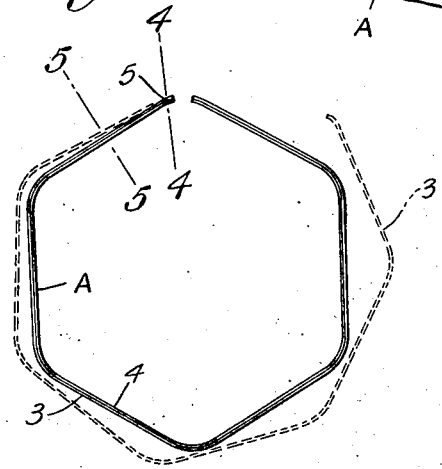
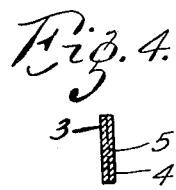
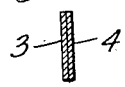
INVENTOR.
CHARLES A. MARIEN.
BY Harry A. Beimes
ATTORNEY.

Patented Dec. 1, 1931

1,834,067

UNITED STATES PATENT OFFICE

CHARLES A. MARIEN, OF ST. LOUIS, MISSOURI, ASSIGNOR TO RAMSEY ACCESSORIES MFG. CORPORATION, OF ST. LOUIS, MISSOURI, A CORPORATION OF MISSOURI

PISTON RING EXPANDER

Application filed September 13, 1930. Serial No. 481,722.

My invention has relation to improvements in piston packing rings for internal combustion engines and it consists in the novel features of construction more fully set forth in the specification and pointed out in the claims.

The invention is directed more particularly to compound piston rings embodying an outer split packing ring and an inner tension ring, and has for its principal object the provision of outer and inner rings adapted to cooperate for effecting a practically uniform pressure of the packing ring on the engine cylinder throughout its entire circumference.

A further object of the invention is the provision of an inner tension ring comprising a plurality of nested components whereby the tension of the inner ring may be increased without decreasing the flexibility thereof. Further and other advantages will be better apparent from a detailed description of the invention in connection with the accompanying drawings, in which—

Fig. 1 is a combined side elevation and vertical section of conventional piston equipped with my improved rings; Fig. 2 is a horizontal cross-section taken on the line 2—2 of Fig. 1; Fig. 3 is an edge view of the tension ring; Fig. 4 is a cross-sectional detail taken on the line 4—4 of Fig. 3; and Fig. 5 is a cross-sectional detail taken on the line 5—5 of Fig. 3.

Referring to the drawings, P represents a conventional piston for internal combustion engines operable in the cylinder C, said piston having a plurality of piston ring grooves $g, g, g$ to receive my improved piston packing rings 1, 1 and 2, the two upper rings 1, 1 being the compression rings and the lower ring 2 the oil ring, although this invention makes no distinction between them as it is equally applicable to both types of ring. Therefore, in the following description of the invention no further reference will be made to an oil ring specifically as such.

For many years piston packing rings of various designs, but depending solely on the inherent tension of the ring for their contact with the cylinder wall, have been in general use. However, with the advent of the high speed, high compression engine, such rings, because of their imperfect contact with the cylinder wall, have proven sadly deficient in holding compression and preventing oil pumping. Various devices were employed to overcome these difficulties such as forming the ring to such a shape that on expanding to the size of the cylinder it would take the shape of a perfect circle. This expedient would prove effective only for a limited time in absolutely true cylinders. Should the cylinders be out-of-round (either from wear or heat distortion) this device would be of no value. It was thus soon learned that dependence on the internal tension of the ring alone for close contact entirely around the cylinder wall was not sufficient.

Ring expanders for cooperating with the ring were then adopted. These expanders as now used consist of a spring formed in the general shape of a polygon and are adapted for insertion in the ring groove behind the ring. Owing to their polygonal shape they must be compressed into place and are thus held in restraint between the packing ring and bottom of the ring groove and exert considerable tension (about 4 lbs.) outwardly on the ring at uniformly spaced points in its circumference. In those cases where a cylinder is considerably out of round the expander must needs be capable of exerting considerable outward pressure on the ring to cause it to follow the shape of the cylinder wall and hug it with the required degree of closeness to prevent compression loss and oil leaks. Now in designing an expander having sufficient internal tension to hold the packing ring snugly against the wall the resilience of the expander is decreased and it fails to respond instantly to the movements of the ring as it moves up and down over the cylinder wall. Therefore, some tension must be sacrificed to maintain the required degree of resilience in the expanders now in use.

I have found that the properties of resilience and tension may be maintained at a maximum degree by constructing the tension ring, or expander A of a plurality of separate similar rings 3, 4, assembled in nested relation, as shown in Fig. 3. The rings 3 and 4 are connected (by welding, preferably) at a single point 5 near corresponding ends to form a unitary structure, so that the individual rings are free to move circumferentially relative to each other as the assembled expander A contracts and expands in operation.

The tension of the expander A is, of course, twice that of either of its components 3 or 4, while its resilience is practically the same by virtue of the freedom of relative circumferential movement of the components.

Obviously, where there are more than two components the tension of the expander will be equal to the tension of a single component multiplied by the number of components. Thus, in constructing an expander requiring a given tension, it is built up of thin laminations instead of in one piece. This preserves the flexibility of the expander even though the tension is increased. Comparison may be made to a vehicle leaf spring, the elastic limit of which is proportional to the thickness of each leaf; obviously, if the spring were made in a solid piece, there would be little flexibility.

While I show the expander components joined near one end of the assembled components, I do not wish to be thus restricted as the junction of the elements may be effected at any single point in the circumference.

Having described my invention, I claim:

1. A piston packing ring comprising an outer split ring and an inner spring ring, the latter comprising a plurality of similar nested components and adapted to exert radial tension outwardly against the packing ring.

2. A piston packing ring comprising an outer split ring and an inner spring ring, the latter comprising a plurality of similar nested components, adjacent components being joined at a single point in their circumference.

3. As a new article of manufacture, an expander for engine piston rings, said expander comprising a plurality of similar spring leaves arranged in nesting relation.

In testimony whereof I hereunto affix my signature.

CHARLES A. MARIEN.